United States Patent
Ashida et al.

(10) Patent No.: US 9,477,430 B2
(45) Date of Patent: Oct. 25, 2016

(54) ADAPTING TRANSFER RATE OF CACHED DATA TO PREVENT STOPPAGE OF DATA TRANSMISSION

(71) Applicant: GLOBALFOUNDRIES Inc., Grand Cayman (KY)

(72) Inventors: Takashi Ashida, Yamato (JP); Tohru Hasegawa, Tokyo (JP); Hiroshi Itagaki, Yokohama (JP); Shinsuke Mitsuma, Tokyo (JP); Terue Watanabe, Tokyo (JP)

(73) Assignee: GLOBALFOUNDRIES INC., Grand Cayman (KY)

( * ) Notice: Subject to any disclaimer, the term of this patent is extended or adjusted under 35 U.S.C. 154(b) by 202 days.

(21) Appl. No.: 14/289,883

(22) Filed: May 29, 2014

(65) Prior Publication Data
US 2015/0022917 A1 Jan. 22, 2015

(30) Foreign Application Priority Data
Jul. 16, 2013 (JP) .................................. 2013-147754

(51) Int. Cl.
G06F 13/00 (2006.01)
G06F 3/06 (2006.01)
G06F 12/08 (2016.01)
G11B 20/10 (2006.01)

(52) U.S. Cl.
CPC ........... *G06F 3/0686* (2013.01); *G06F 3/0613* (2013.01); *G06F 3/0656* (2013.01); *G06F 12/0866* (2013.01); *G11B 2020/10768* (2013.01)

(58) Field of Classification Search
CPC .. G06F 3/0686; G06F 3/0613; G06F 3/0656; G06F 12/0866; G11B 2020/10768

USPC ....... 711/115, 118, 154; 700/213; 369/30.06, 369/178.01; 360/98.01
See application file for complete search history.

(56) References Cited

U.S. PATENT DOCUMENTS

| | | | | |
|---|---|---|---|---|
| 5,687,348 A | * | 11/1997 | Whittaker | G06F 12/0831 711/133 |
| 6,549,992 B1 | * | 4/2003 | Armangau | G06F 11/1456 707/999.202 |
| 8,369,039 B2 | * | 2/2013 | Fujihara | G11B 5/00813 360/55 |
| 8,886,880 B2 | * | 11/2014 | Barrell | G06F 12/0891 711/103 |

(Continued)

FOREIGN PATENT DOCUMENTS

| | | |
|---|---|---|
| JP | 2004048662 A | 2/2004 |
| JP | 2006180383 A | 7/2006 |

(Continued)

*Primary Examiner* — Hong Kim
(74) *Attorney, Agent, or Firm* — Yuanmin Cai; Andrew M. Calderon; Roberts Mlotkowski Safran Cole & Calderon P.C.

(57) ABSTRACT

A file system to controls access to a tape library that selectively loads and unloads a plurality of cartridges from a plurality of slots to a drive for transmitting to the file system archived data retrieved from a particular cartridge. The file system includes a cache and receives a request from a requestor to access the tape library, estimates a first data transfer rate from an anticipated tape library operation completion duration and from a capacity of cached data to be transmitted from the cache to the requestor, initiates access to the tape library, and adapts the first data transfer rate to a second data transfer rate to transmit the capacity of the cached data to the requestor throughout the anticipated tape library operation completion duration.

20 Claims, 6 Drawing Sheets

(56) References Cited

U.S. PATENT DOCUMENTS

| | | |
|---|---|---|
| 2004/0008688 A1 | 1/2004 | Matsubara et al. |
| 2007/0180119 A1 | 8/2007 | Khivesara et al. |
| 2009/0063698 A1 | 3/2009 | Xu et al. |
| 2009/0077311 A1* | 3/2009 | Amano ............... G06F 11/1458 711/111 |
| 2011/0179222 A1* | 7/2011 | Iwasaki ................ G06F 3/0611 711/111 |
| 2013/0044386 A1* | 2/2013 | Sato ..................... G11B 23/042 360/15 |

FOREIGN PATENT DOCUMENTS

| | | |
|---|---|---|
| JP | 2009525641 A | 7/2009 |
| JP | 2009205548 A | 9/2009 |
| JP | 4596693 | 12/2010 |
| JP | 2010538581 A | 12/2010 |

* cited by examiner

ADAPTING TRANSFER RATE OF CACHED DATA TO PREVENT STOPPAGE OF DATA TRANSMISSION

FIELD

Embodiments of the present invention relate to a file system for a tape library. More specifically, embodiments of the present invention relate to techniques for adapting the transmission of archived data retrieved from a tape library and the transmission of cached data.

DESCRIPTION OF THE RELATED ART

An application that wishes to access a tape library issues an associated request via a file system. The tape library begins operations to move a cartridge into a drive to be read. The tape library may unload a cartridge currently loaded in the tape drive prior to loading the required cartridge. Because physical operations are performed to unload a cartridge from the tape device and load another cartridge into the tape device, it can sometimes take several seconds and even a few minutes to access data archived in a tape cartridge. In order to minimize the time between the application making the request to access the tape library and actually beginning to access associated data that is cached, for example, on a disk may be returned to the application prior to the completion of the physical operations of the tape library such that data may be returned from the cartridge.

SUMMARY

In various embodiments of the present invention potential exhaustion of the return of the cached data prior to completion of the tape library operations is avoided. Thus, in various embodiments of the present invention, while cached data is being transmitted, the transfer rate of data from the cache is intentionally slowed in order to complete tape library operations. The completion time of tape library operations can be roughly estimated. Therefore, a selection method is used which includes a rough time estimation and changing the amount of data transmitted per unit of time during the process in view of the amount of data remaining in the cache.

An apparent stoppage in the transmission of data can be avoided while using less cache size and the continuous transmission of data can be recognized by the user and management software monitoring the transfer rate. Some embodiments of the present invention are particularly effective when the user is not directly aware of physical devices such as in cloud storage environment.

In a particular embodiment of the present invention, a method for adapting a transfer rate of cached data in a file system controlling access to a tape library includes receiving, at the file system, a request to access the tape library; estimating, at the file system, a first data transfer rate from an anticipated tape library operation completion duration and from a capacity of cached data to be transmitted from a cache of the file system; initiating, at the file system, access to the tape library; and adapting, at the file system, the first data transfer rate to a second data transfer rate to transmit the capacity of the cached data throughout the anticipated tape library operation completion duration.

In another embodiment of the present invention, a non transitory computer program product comprised within a file system configured to control access to a tape library and adapt a data transfer rate of cached data includes program instructions that when executed cause the file system to: receive a request to access the tape library; estimate a first data transfer rate from an anticipated tape library operation completion duration and from a capacity of cached data to be transmitted from a cache; initiate access to the tape library; and adapt the first data transfer rate to a second data transfer rate to transmit the capacity of the cached data throughout the anticipated tape library operation completion duration.

In another embodiment of the present invention, a system for adapting a transfer rate of cached data includes a tape library and a file system. The tape library selectively loads and unloads a plurality of cartridges from a plurality of slots to a drive for transmitting to the file system archived data retrieved from a particular cartridge. The file system controls the tape library, includes a cache, and is configured to receive a request from a requestor to access the tape library, estimate a first data transfer rate from an anticipated tape library operation completion duration and from a capacity of cached data to be transmitted from the cache to the requestor, initiate access to the tape library, and adapt the first data transfer rate to a second data transfer rate to transmit the capacity of the cached data to the requestor throughout the anticipated tape library operation completion duration.

These and other embodiments, features, aspects, and advantages will become better understood with reference to the following description, appended claims, and accompanying drawings.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

The drawings are not necessarily to scale. The drawings are merely schematic representations, not intended to portray specific parameters of the invention. The drawings are intended to depict only exemplary embodiments of the invention. In the drawings, like numbering represents like elements.

DETAILED DESCRIPTION

Figure 1:
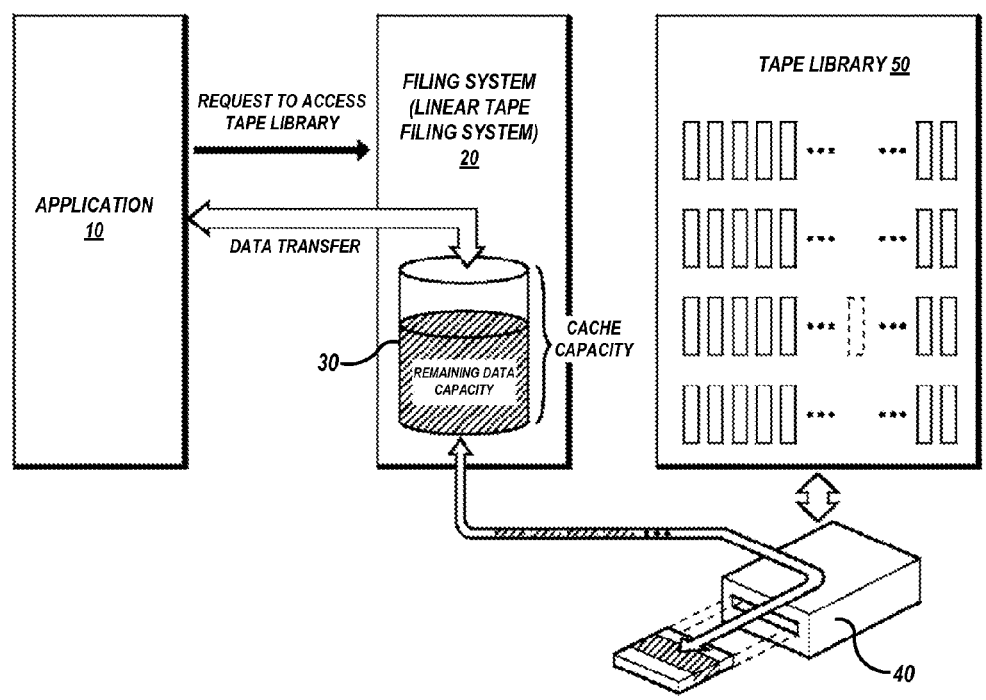
FIG. 1 is a schematic diagram showing the relationship between a tape library, a file system, and an application.

FIG. 1 is a schematic diagram showing the relationship between a tape library, a file system, and an application. A tape library 50 includes a plurality of tapes that may store or archive a large quantity of data. The tape library 50 is controlled via a file system 20. An exemplary file system 20 is the IBM® Linear Tape File system (LTFS).

The file system 20 controls tape library 50 such that an application 10 does not have to be aware of the library 50, driving ease of use of a tape drive 40 by a user of the application 10. In addition, because of its inherently low-cost, high-capacity characteristics, the use of tape storage devices has been considered for storage in cloud based systems. In some embodiments, the file system 20 and tape drive 40 can be combined and provided as a system.

When application 10 wishes to access tape library 50, application 10 issues a request to access the tape library 50 and file system 20 receives the request. The tape library 50 begins operating once the file system 20 receives the request. In order to move the requested cartridge, the tape library 50 often unloads an unnecessary cartridge currently loaded in a tape device (e.g. drive 40, etc.) and loads the required cartridge. Because a physical operation is performed to unload a cartridge from the tape device and load another cartridge into the tape device, it can sometimes take several seconds and even a few minutes to access data archived in a tape cartridge.

In order to eliminate the time difference between making the request to access the tape library 50 and actually beginning to access associated data, a technique has been considered in which files are cached, for example, on a disk. The cache 30 included in the file system 20 plays this role. A hard disk drive (HDD) is generally used as cache 30 for caching or storage data, but another type of memory can be used such as a semiconductor memory.

Figure 2A:
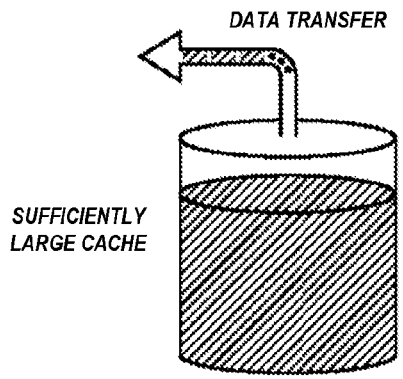
FIG. 2A-FIG. 2C are schematic diagrams depicting a large enough cache to conceal the time difference until data actually begins to be accessed via the operation of a tape library.
Figure 2B:
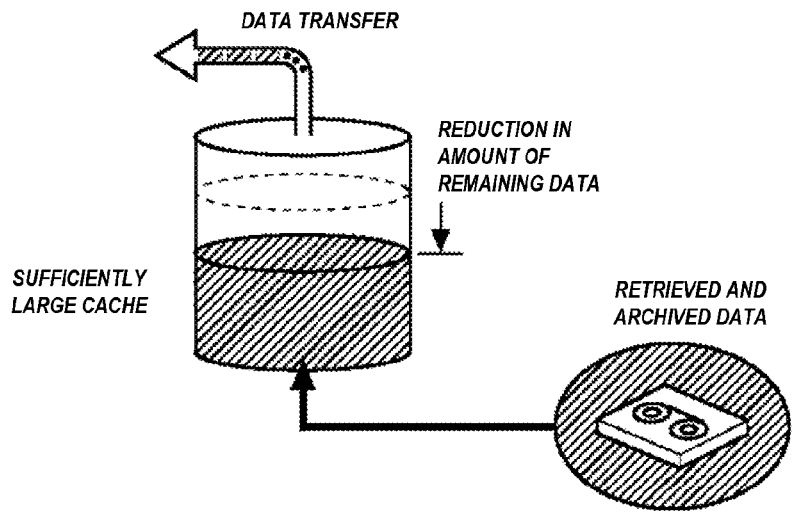
Figure 2C:
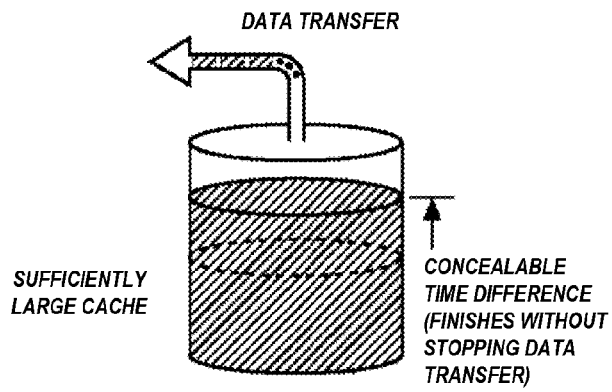

FIG. 2 is a schematic diagram used to explain an exemplary technique utilizing a large enough cache 30 to conceal the time difference between making the request to access the tape library 50 and accessing data from tape library 50. In this exemplary technique, when the request is received to access a certain file, as shown in FIG. 2A, the file, which has been cached on cache 30, may be transferred (returned, etc.) as data. As the transfer of cached data continues, the remaining amount of cached data is gradually reduced as shown in FIG. 2B. It takes time to complete the tape library 50 operations in order to begin to retrieve data from the tape device. By utilizing cache 30, as shown in FIG. 2C, the time difference until data begins to be accessed via tape library operations can be concealed. In other words, the transfer or return of the data to application 10 is uninterrupted. When such exemplary technique is used, an increasing time difference can be concealed by increasing the amount of data stored in cache 30. However, and storing a sufficient amount of data upon cache 30 from all files in order to conceal the largest anticipated time difference may result in a undesired cache 30 capacity and associated expense.

FIG. 3 is a schematic diagram used to explain an exemplary situation that occurs when a small cache 30 is used during the time required to actually begin accessing data via tape library 50 operations. Even when disk space is saved by reducing the amount of data handled by the cache 30, the transfer of data can be continued until some data remains as shown in FIG. 3A, FIG. 3B, and FIG. 3C. However, as shown in FIG. 3D, while waiting for the tape library 50 operations to be completed, cached data becomes exhausted and the transfer of data is stalled. In order to resume the transfer of data, retrieved archived data has to reach the exhausted cache 30 as shown in FIG. 3E. In other words, when the amount of cached data is reduced to save disk space, the data in the cache 30 may become transferred before tape library 50 operations have been completed. When viewed from the perspective of the user accessing the tape library 50, the data transfer rate changes over time from the transfer rate of data retrieved from the cache 30, a data transfer stoppage (awaiting the completion of library 50 operations), and the transfer rate of data retrieved from the tape device.

Figure 3A:
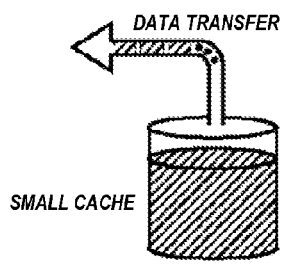
FIG. 3A-FIG. 3E are schematic diagrams depicting a small cache used during the time required to actually begin accessing data via tape library operations.
Figure 3B:
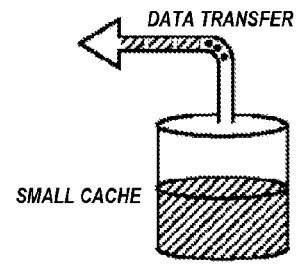
Figure 3C:
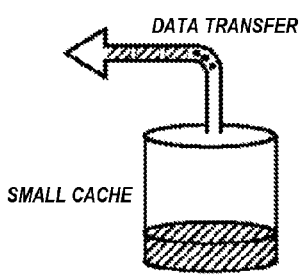
Figure 3D:
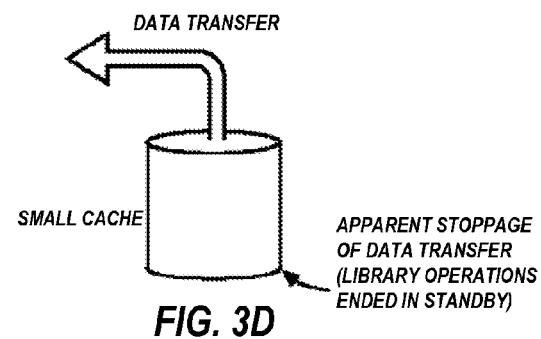
Figure 3E:
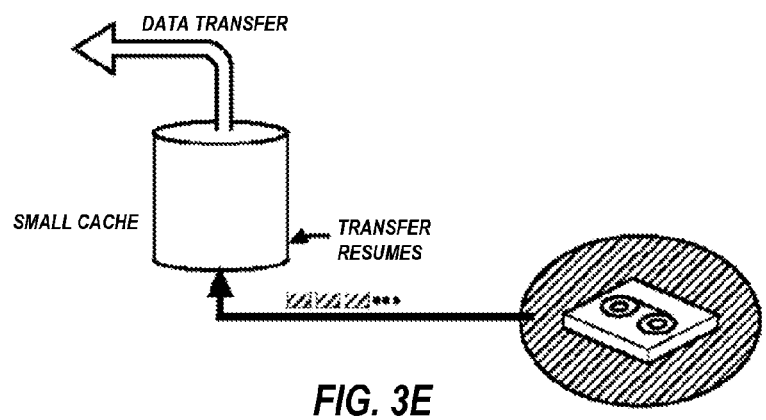

Referring to FIG. 3D, the transfer of data appears to have stalled. If the tape library 50 is currently being utilized in a cloud environment, the user accessing data may not be able to distinguish between this data transfer stall or an error that has occurred in the connection to the tape library 50 (i.e. cloud, etc.). Similarly, when file system 20 is monitoring the transfer rate to determine whether the connection has been interrupted, the file system 20 may mistakenly initiate the reconnection process. Such scenario may result in inefficient utilization of the file system.

Thus, it is an object of an embodiment to adapt the data transfer rate from the cache 30 to make full use of cache 30 capacity while undergoing file system 50 operations such that the switching to data transferred from the tape library occurs smoothly (e.g. overall data transfer does not stop, etc.) once the transfer of data from the cache has ended.

Figure 4A:
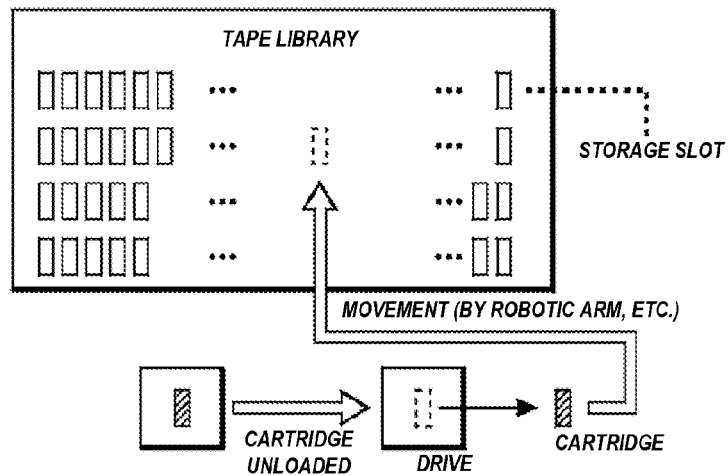
FIG. 4A-FIG. 4C are schematic diagrams depicting a tape library incorporating various embodiments of the present invention.
Figure 4B:
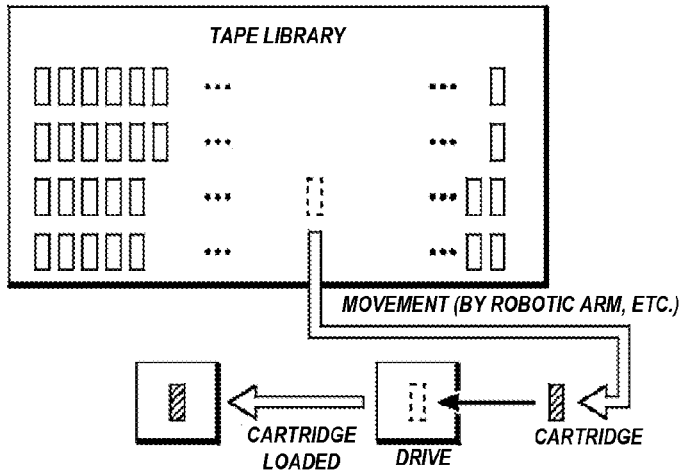
Figure 4C:
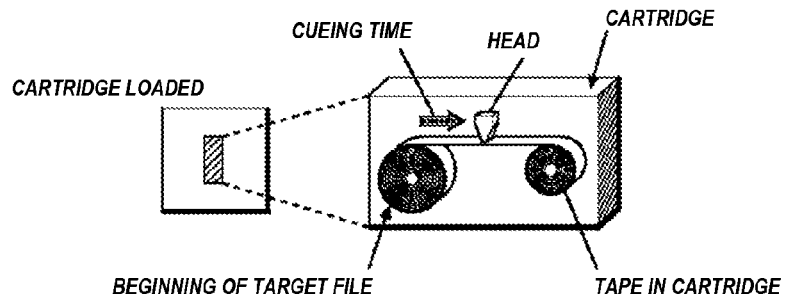

FIG. 4A-FIG. 4C are schematic diagrams depicting a tape library incorporating various embodiments of the present invention. FIG. 4A is a schematic diagram depicting the operations performed to unload a cartridge. Because a cartridge is usually loaded in drive 40 (e.g. drive 40 is in an occupied state), the unloading operation is performed when the request for access to the tape library 50 has been received and the requested archived data is not stored on the loaded cartridge. In other words, the cartridge has to be unloaded from drive 40, and the unloaded cartridge has to be moved to a predetermined storage slot in the tape library 50. Usually, the cartridge is moved by a robotic arm. Therefore, in FIG. 4A, the estimated time for performing the unloading operation is "the time to unload the cartridge"+"the time required to move the cartridge from the drive to a storage slot". Because the distance from the drive 40 to the storage slot is not constant, there may be some variation in the time required to move the cartridge from the drive to the storage slot. Therefore, in some embodiments, the time required to move the cartridge from the drive to a storage slot may be the average time required to move a cartridge from the drive to a storage slot.

FIG. 4B is a schematic diagram used to explain the cartridge loading operations. The file system 50 identifies the cartridge containing the archived data, moves the loading arm to the location of the cartridge, moves the cartridge from the storage slot to the drive 40, and loads the cartridge into the drive 40. Therefore, in FIG. 4B, the estimated time for performing the loading operation is "the time required to move a cartridge from a storage slot to the drive"+"the time to load the cartridge". There may be some variation in the time required to move the cartridge from the slot to drive 40. Therefore, in some embodiments, the time required to move a cartridge from a storage slot to the drive may be the average time required to move a cartridge from a slot to the drive 40.

FIG. 4C is a schematic diagram used to explain the positioning operation performed to position the target file in the loaded cartridge. Because the tape is wound inside the cartridge, in response to a request for access to the tape library 50, the location of the archived data on the tape loaded in the cartridge is determined, the tape is mechanically wound to an associated location, and the data retrieved using the head. The position of the tape varies at loading time. Therefore the time required to reach the target data also varies. Some types of cartridges have one reel and are rewound on a reel inside drive 40. Cartridges of this type may be rewound during the unloading process. As a result, utilizing one reel and/or are rewound cartridges, the time required from loading to reach the target data similar from instance to instance. Therefore, in FIG. 4C, the estimated tape positioning time is the "time required to position the target file inside the loaded cartridge."

When the file system 50 can acquire location information on the target file/data from drive 40, the accuracy of the estimated time can be improved. The sum of the estimated time for performing the unloading operation (i.e. FIG. 4A), the estimated time for performing the loading operation (i.e. FIG. 4B), and estimated tape positioning time (i.e. FIG. 4C) may be used as the anticipated tape library operation completion duration.

Estimating the Transfer Rate: When a data transfer is initiated by the request of application 10, the file system 50 calculates (estimates) the initial data transfer rate from the initially estimated timing for completion of startup and from the capacity for remaining data to be transmitted in the cache 30 of the file system 50. The data transfer rate can be estimated (calculated) using the capacity of the remaining data to be transmitted from cache 30 and estimated positioning time. When remaining capacity of cache 30 falls below 75%, the initial data transfer rate may be updated to modify the remaining capacity of cache 30 with respect to the remaining data capacity and the estimated positioning time. In addition, the estimated positioning time remaining in which the current operation is carried out may be estimated (calculated) at each respective step in the estimated positioning time. For example, when the tape library 50 operations complete the unloading of a cartridge, the estimated positioning time may be changed to the estimated time for performing the loading operation (i.e. FIG. 4B) summed with the estimated tape positioning time, or the remaining data capacity may be used as the reference remaining capacity in the next estimation (calculation). Similarly, when the remaining capacity of the cache reaches the "reference remaining data capacity" of 75%, the remaining capacity of the cache 30 may be corrected with respect to the remaining capacity and current estimated position time, and the reference remaining data capacity may be updated. This cycle can then be repeated.

This estimation (calculation) is merely an example and can be adapted, depending on the intended purpose, to use more parameters as long as an apparent data transmission stall is avoided. For example, the embodiments of the present invention can be adopted in an algorithm for calculating a faster data transfer rate or in an algorithm for reducing fluctuations in the data transfer rate and maintaining a constant data transfer rate as much as possible.

Figure 5:
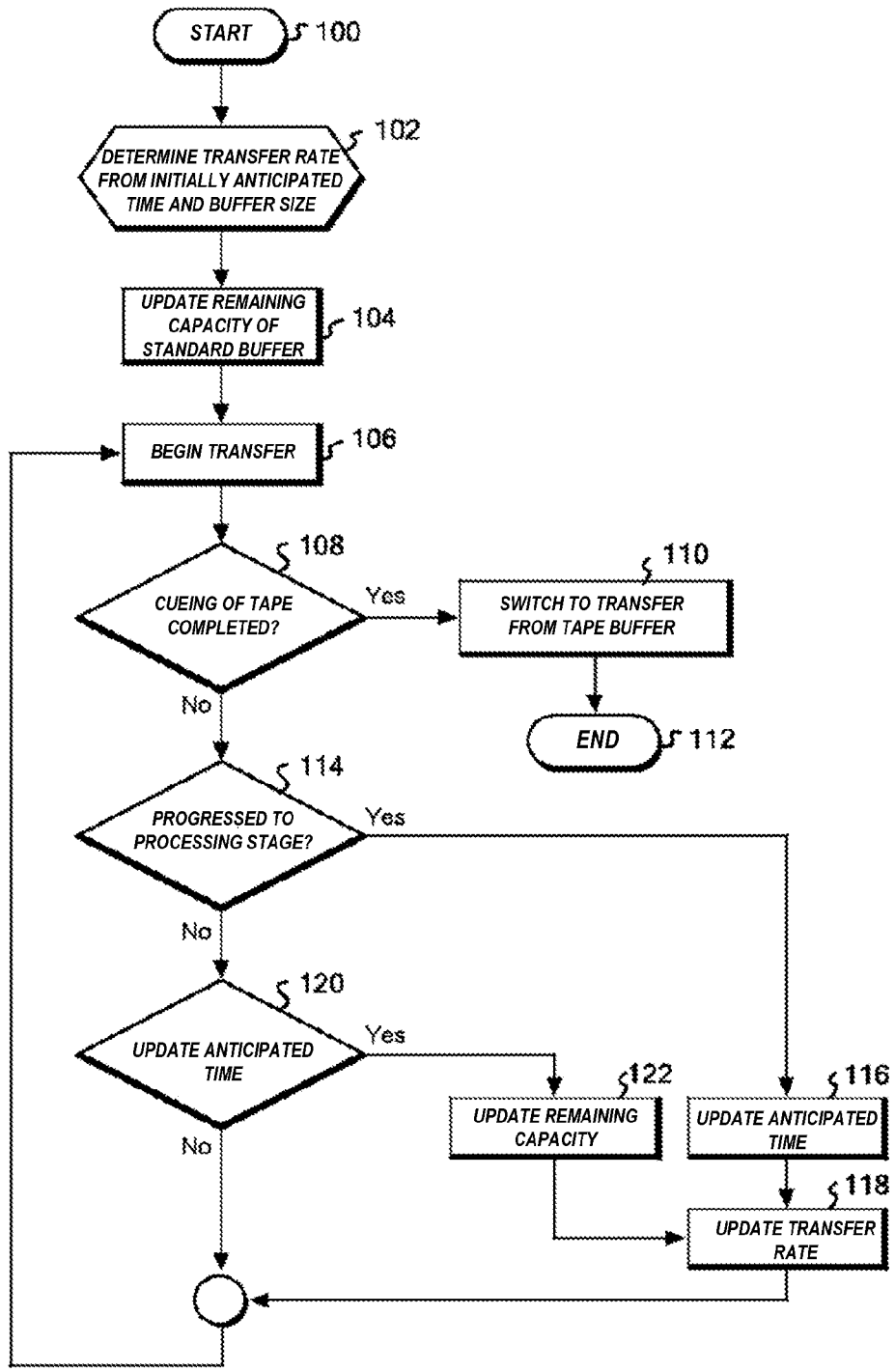
FIG. 5 is a flowchart depicting a method for transfer rate estimation, according to various embodiments of the present invention.

FIG. 5 is a flowchart depicting a method 100 for transfer rate estimation, according to various embodiments of the present invention. The transfer rate estimation (calculation) explained above is summarized in this flowchart. Method 100 begins at block 100 and continues with determining a data transfer rate from an initially anticipated time and cache 30 size (block 102). Method 100 may continue with updating remaining cache 30 capacity (block 104). Method 100 may continue with beginning data transfer (block 106). It is determined whether cueing of the tape of a cartridge is completed (block 108). If the cueing of the tape of a cartridge is completed, method 100 may continue with switching data transfer from cache 30 to data transfer from tape library 50 (block 110). If the cueing of the tape of a cartridge is not completed, it is determined whether the data transfer has progressed to processing stage (block 114). If it is determined the data transfer has progressed to processing stage, method 100 may continue with updating the anticipated time (block 116), updating the data transfer rate (block 118) and returning to block 106. If it is determined the data transfer has not progressed to processing stage, method 100 may continue with determining whether to update the anticipated time (block 120). If it is determined to update the anticipated time, method 100 may continue with updating the remaining capacity of cache 30 (block 122), updating the data transfer rate (block 118), and returning to block 106. If it is determined to not update the anticipated time, method 100 may continue by returning to block 106.

Figure 6:
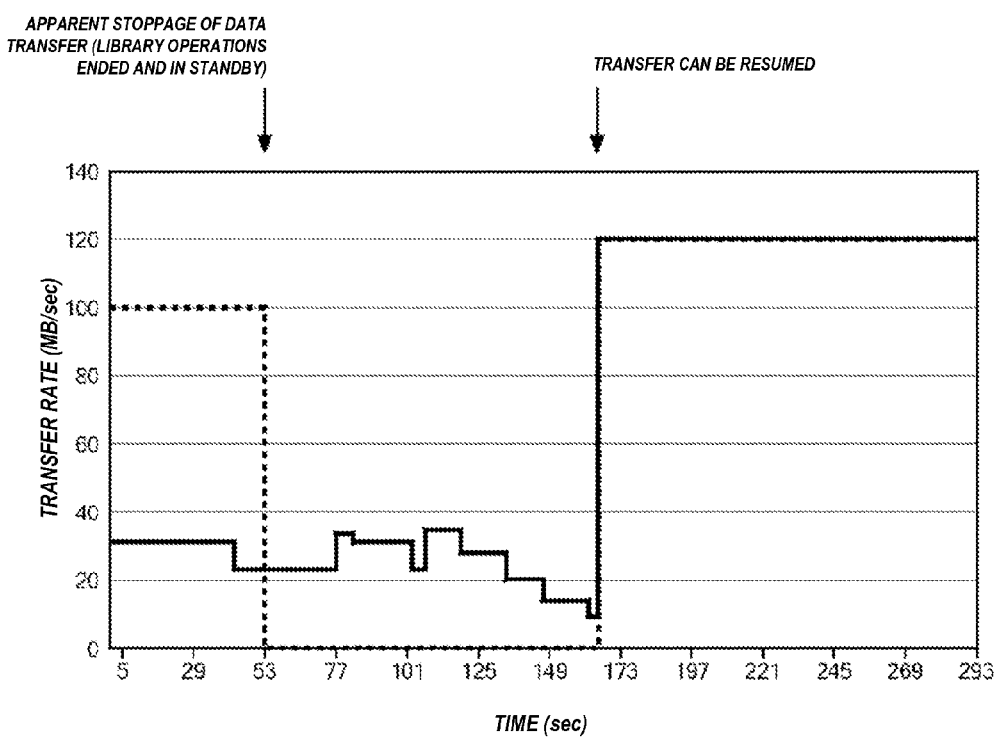
FIG. 6 is a graph of a simulation depicting the file system adapting the data transfer rate, according to various embodiments of the present invention.

FIG. 6 is a graph of a simulation depicting the file system adapting the data transfer rate, according to various embodiments of the present invention. The change in the data transfer rate in a known system is indicated by the dotted line and the change in the data transfer rate when implementing the various embodiments of the present invention is indicated by the solid line. The transfer rate in known system falls to zero and the transmission of data appears to have stalled. The data transfer rate of the known system changes over time from the transfer rate of data retrieved from the disk, to a data transfer stoppage (awaiting the completion of library operations), and then to the transfer rate of data retrieved from the tape.

However, in utilizing the various embodiments of the present invention the data transfer rate does not drop to zero and is adapted by file system 50 such that the anticipated timing of the data transfer coincides with the completion the tape library 50 operations.

The invention claimed is:

1. A method for adapting a transfer rate of cached data in a file system controlling access to a tape library comprising:
   receiving, at the file system, a request to access the tape library;
   estimating, by the file system, a first data transfer rate from an anticipated tape library operation completion duration and from a capacity of cached data to be transmitted from a cache of the file system;
   initiating access to the tape library; and
   adapting the first data transfer rate to a second data transfer rate to transmit the capacity of the cached data throughout the anticipated tape library operation completion duration.

2. The method according to claim 1, wherein adapting the first data transfer rate to a second data transfer rate further comprises:
   updating the first data transfer rate with the second data transfer rate.

3. The method according to claim 1, wherein adapting the first data transfer rate to a second data transfer rate further comprises:
   determining remaining capacity of the cached data.

4. The method according to claim 3, wherein the first data transfer rate is updated in response to the determined remaining capacity of the cached data indicating at least 75% utilization of the cache so that when the remaining capacity of the cached data falls below 75%, the first data rate is updated to modify the remaining capacity of the cached data with respect to a remaining data capacity and an estimated positioning time which is estimated at each respective step, while when the remaining capacity of the cached data reaches 75%, the remaining capacity of the cached data is corrected with respect to an updated remaining data capacity and a current estimated position time.

5. The method according to claim 1, wherein adapting the first data transfer rate to a second data transfer rate further comprises:
   initiating access to archived data in the tape library and determining whether positioning of tape within a tape cartridge is completed;
   retrieving archived data when it has been determined that the tape has been cued; and
   switching smoothly from the transmission of cached data to the transmission of archived data subsequent to transmission of the capacity of the cached data.

6. The method according to claim 1, wherein adapting the first data transfer rate to a second data transfer rate further comprises:
   changing the transmission of cached data to archived data retrieved from the tape library without stopping data transmission.

7. The method according to claim 1, wherein the anticipated tape library operation completion duration is an estimated time calculated as the sum of:
   a duration of unloading a first cartridge and moving the first cartridge from a drive to a first slot within the tape library;
   a duration of moving and loading a second cartridge from a second slot to the drive; and
   a tape positioning duration for positioning a target file in the loaded cartridge.

8. A non transitory computer program product comprised within a file system configured to control access to a tape library and adapt a data transfer rate of cached data, the computer program product comprising program instructions that are stored on a non-transitory computer readable storage medium and when executed cause the file system to:
   receive a request to access the tape library;
   estimate a first data transfer rate from an anticipated tape library operation completion duration and from a capacity of cached data to be transmitted from a cache;
   initiate access to the tape library; and
   adapt the first data transfer rate to a second data transfer rate to transmit the capacity of the cached data throughout the anticipated tape library operation completion duration.

9. The computer program product of claim 8, wherein the program instructions to adapt the first data transfer rate to a second data transfer rate further cause the file system to:
   update the first data transfer rate with the second data transfer rate.

10. The computer program product of claim 8, wherein the program instructions to adapt the first data transfer rate to a second data transfer rate further cause the file system to:
    determine remaining capacity of the cached data.

11. The computer program product of claim 10, wherein the first data transfer rate is updated in response to the determined remaining capacity of the cached data indicating at least 75% utilization of the cache so that when the remaining capacity of the cached data falls below 75%, the first data rate is updated to modify the remaining capacity of the cached data with respect to a remaining data capacity and an estimated positioning time which is estimated at each respective step, while when the remaining capacity of the cached data reaches 75%, the remaining capacity of the cached data is corrected with respect to an updated remaining data capacity and a current estimated position time.

12. The computer program product of claim 8, wherein the program instructions to adapt the first data transfer rate to a second data transfer rate further cause the file system to:
    initiate access to archived data in the tape library and determine whether positioning of tape within a tape cartridge is completed;
    retrieve archived data when it has been determined that the tape has been cued; and
    switch smoothly from the transmission of cached data to the transmission of archived data subsequent to transmission of the capacity of the cached data.

13. The computer program product of claim 8, wherein the program instructions to adapt the first data transfer rate to a second data transfer rate further cause the file system to:
    change the transmission of cached data to archived data retrieved from the tape library without stopping data transmission.

14. The computer program product of claim 8, wherein the anticipated tape library operation completion duration is an estimated time calculated as the sum of:
    a duration of unloading a first cartridge and moving the first cartridge from a drive to a first slot within the tape library;
    a duration of moving and loading a second cartridge from a second slot to the drive; and
    a tape positioning duration for positioning a target file in the loaded cartridge.

15. A system for adapting a transfer rate of cached data, the system comprising:
    a tape library to selectively load and unload a plurality of cartridges from a plurality of slots to a drive for transmitting to the file system archived data retrieved from a particular cartridge; and
    a file system to control the tape library, the file system comprising a cache and configured to receive a request from a requestor to access the tape library;
    estimate a first data transfer rate from an anticipated tape library operation completion duration and from a capacity of cached data to be transmitted from the cache to the requestor; initiate access to the tape library; and
    adapt the first data transfer rate to a second data transfer rate to transmit the capacity of the cached data to the requestor throughout the anticipated tape library operation completion duration.

16. The system claim 15, wherein file system is further configured to update the first data transfer rate with the second data transfer rate.

17. The system claim 15, wherein file system is further configured to determine remaining capacity of the cached data.

18. The system claim 17, wherein the first data transfer rate is updated in response to the determined remaining capacity of the cached data indicating at least 75% utilization of the cache so that when the remaining capacity of the cached data falls below 75% , the first data rate is updated to modify the remaining capacity of the cached data with respect to a remaining data capacity and an estimated positioning time which is estimated at each respective step, while when the remaining capacity of the cached data reaches 75%, the remaining capacity of the cached data is corrected with respect to an updated remaining data capacity and a current estimated position time.

19. The system of claim 15, wherein file system is further configured to:
- initiate access to archived data in the tape library and determine whether positioning of tape within a tape cartridge is completed;
- retrieve archived data when it has been determined that the tape has been cued; and
- switch smoothly from the transmission of cached data to the transmission of archived data subsequent to transmission of the capacity of the cached data.

20. The system of claim 15, wherein the anticipated tape library operation completion duration is an estimated time calculated as the sum of:
- a duration of unloading a first cartridge and moving the first cartridge from a drive to a first slot within the tape library;
- a duration of moving and loading a second cartridge from a second slot to the drive; and
- a tape positioning duration for positioning a target file in the loaded cartridge.

* * * * *